F. W. BRUSCH.
IRON TONGUE AND GROOVE PILING AND BEAMS.
APPLICATION FILED MAR. 24, 1915.
1,197,441.
Patented Sept. 5, 1916.
4 SHEETS—SHEET 2.
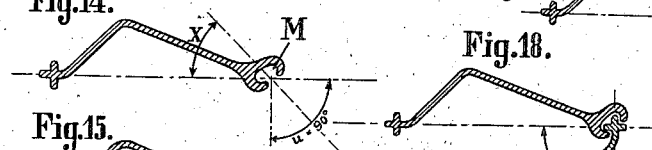
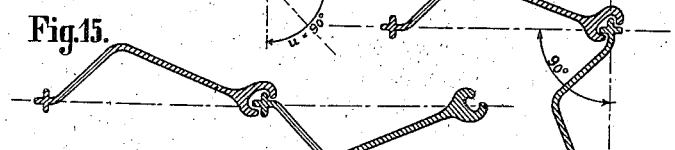
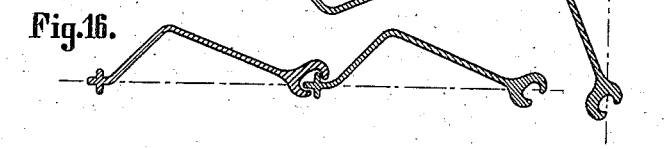
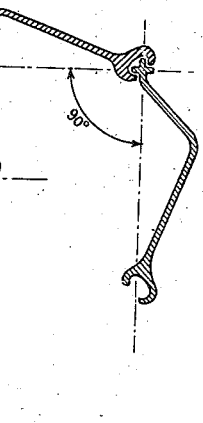
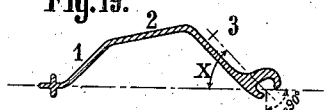
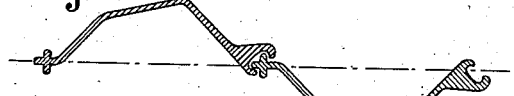
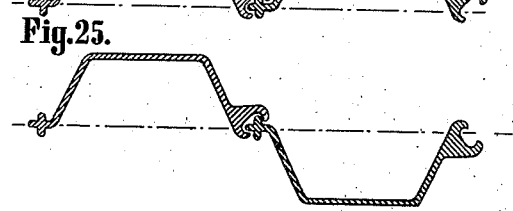
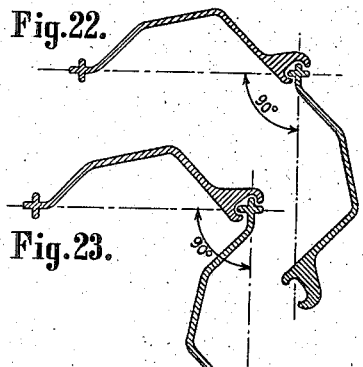
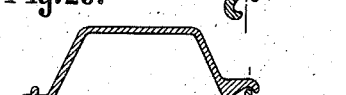
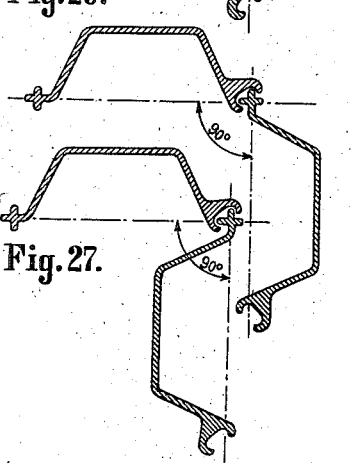

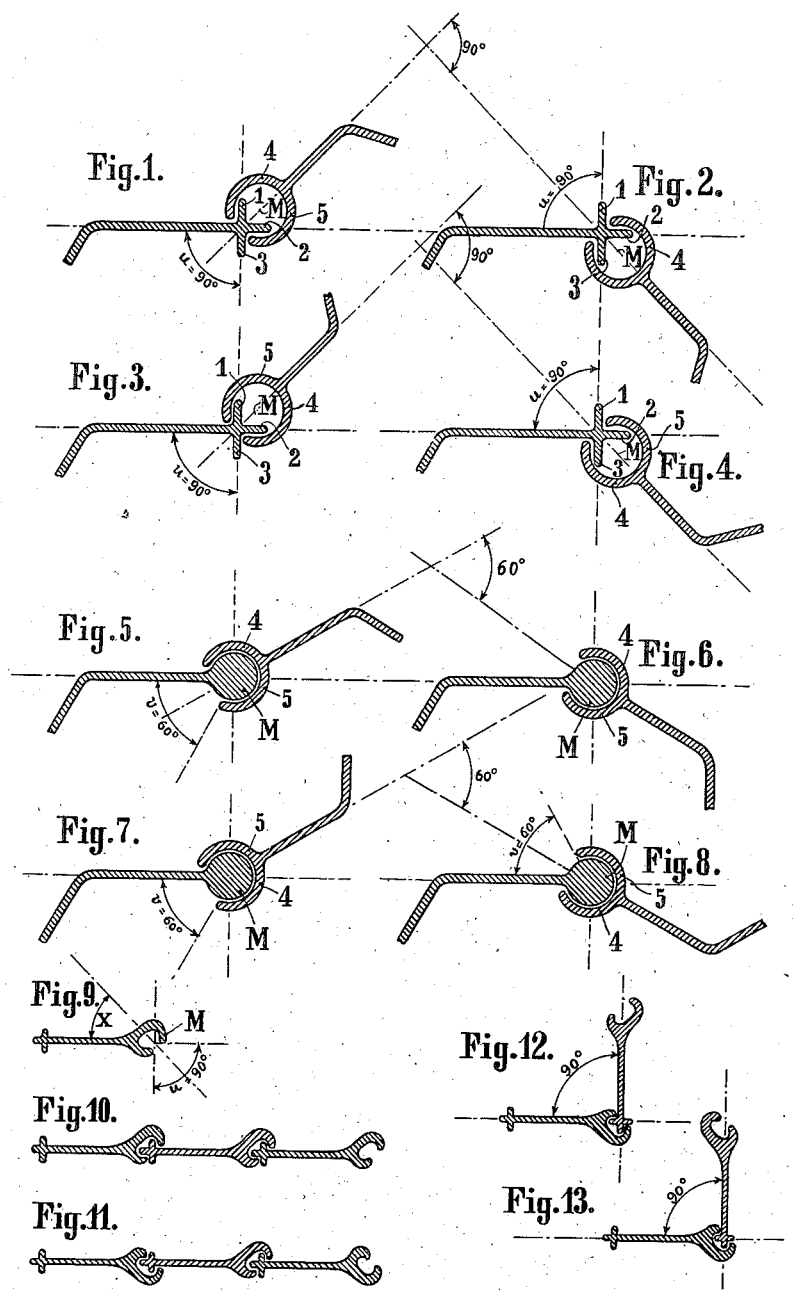

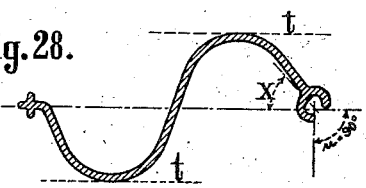
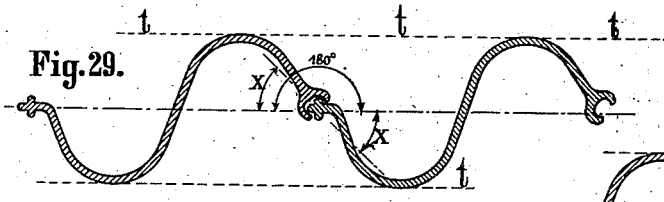
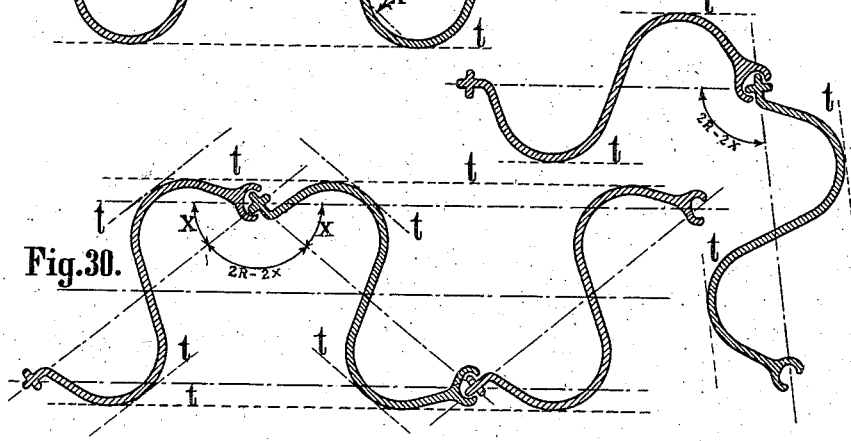
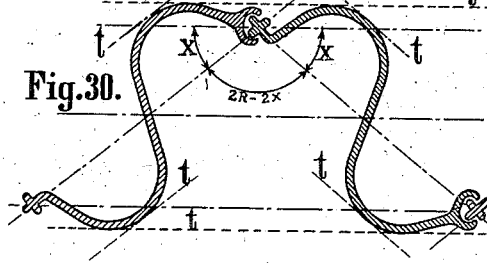
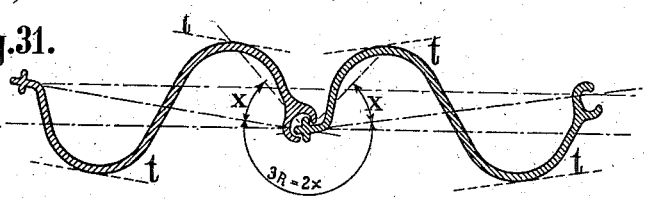

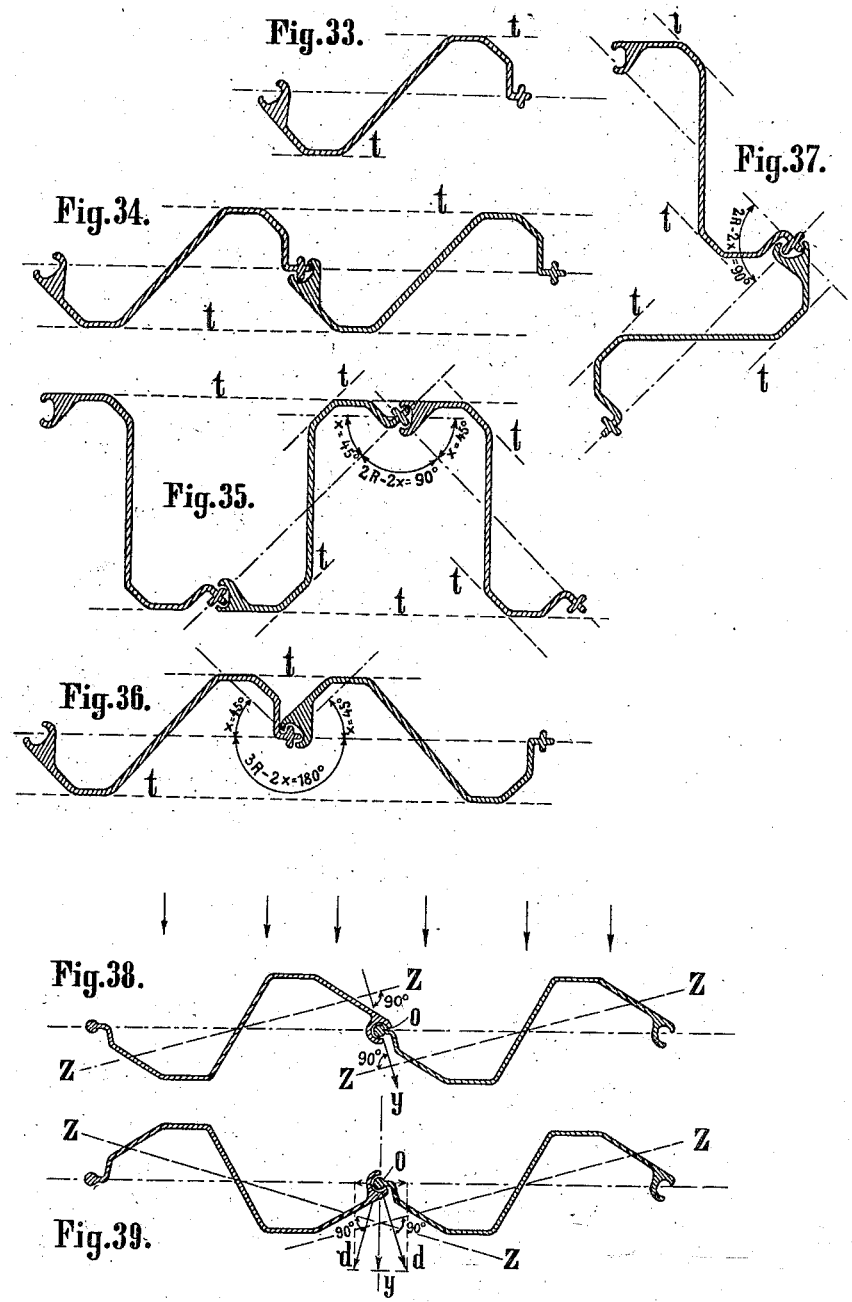

UNITED STATES PATENT OFFICE.

FRIEDRICH WILHELM BRUSCH, OF DORTMUND, GERMANY, ASSIGNOR TO THE FIRM OF DEUTSCH-LUXEMBURGISCHE BERGWERKS- UND HÜTTEN-AKTIENGESELLSCHAFT, OF BOCHUM, GERMANY.

IRON TONGUE-AND-GROOVE PILING AND BEAMS.

1,197,441.   Specification of Letters Patent.   Patented Sept. 5, 1916.

Application filed March 24, 1915. Serial No. 16,790.

*To all whom it may concern:*

Be it known that I, FRIEDRICH WILHELM BRUSCH, a citizen of the German Empire, residing at Dortmund, Germany, have invented certain new and useful Improvements in Iron Tongue-and-Groove Piling and Beams, of which the following is a specification.

In recent times tongue-and-groove beams of iron have been used in foundations and walls instead of wood, which has the practical advantage that it can be had, from the smallest to the largest sizes in thicknesses which vary only slightly, so that the greatest possible adaptation to the nature of the ground and static values can be obtained. With iron tongue-and-groove beams the same variety of profile cannot be obtained, by reason of the many trains of rolls required; moreover, iron cannot be worked so easily as wood.

The object of the present invention is to better adapt the use of tongue-and-groove beams to requirement, and the invention enables, for example, a four-fold combination to be obtained with a single train of rolls, and under certain conditions more wall-forming combinations. The term wall-forming combination, applied to the rolled product, is here used to indicate an iron wall formation in which the axis of gravity of the wall is a straight line.

The accompanying drawings illustrate several forms of tongue-and-groove beams allowing variation in combining them.

Figures 1-4 show one form of beam with cross tenon joint and the four different ways of combining the beams. Figs. 5-8 show a form of beam with circular tenon and the various kinds of combination corresponding to Figs. 1-4. Figs. 9-13, 14-18, 19-23, 24-27, 28-32, 33-37 and 38-39 show further variations of beams and beam combinations respectively.

To secure the possibility of four-fold combination it is above all necessary to have a suitable tongue-and-groove joint, allowing of several combinations, and to have profile forms suitable for wall formations according to the above definition. One tongue-and-groove joint suitable in this sense is a cross tenon in combination with suitable claws. The cross tenon shown in Figs. 1 to 4 of the accompanying drawings has three arms 1, 2, 3, two of which are embraced by the claw members 4, 5. In Fig. 1 the member 4 engages the arm 1, and the member 5 the arm 2; in Fig. 2 the member 4 engages the arm 2, and the member 5 the arm 3; in Fig. 3 the member 5 engages the arm 1, and the member 4 the arm 3; and in Fig. 4 the member 5 engages the arm 2 and the member 4 the arm 3. Figs. 3 and 4 are obtained by reversing one of the profile parts in Figs. 1 and 2. If the arms of the cross tenon are equal and at right angles, the difference of inclination of the claw beam in Fig. 2 to the same beam in Fig. 1 is 90°. The same relation exists in Figs. 3 and 4. Different lengths and angles of inclination give angles other than 90°. With the cross tenon having equal arms perpendicular to each other the aperture angle $u$ of the claws in relation to the theoretical center of rotation M, coinciding with the point of intersection of the arms 1, 2 and 3 equals 90°.

Another tongue-and-groove joint is for example afforded by a circular tenon with suitable claws. The positions (end-positions) of the circular tenon are shown in Figs. 5 to 8 and correspond with those in Figs. 1 to 4. The angle of aperture $v$ can be selected as desired, but in view of the clearance required between the tenon and the claws will hardly exceed a maximum of 60°, as otherwise the claws cannot be expected to hold the tenon.

Each profile has two junction parts, which may be like or unlike, that is to say both may have claws or tenons, or one of each kind of junction parts. About the connecting line of the theoretical centers of rotation at the junction are grouped the other parts of the profile; these may be unbent or bent, straight or curved bars, on one side or both sides of the connecting line of the joint centers. Among these profile formations are some distinguished by qualities hitherto unknown, which render them particularly useful in practice.

If the bar between the theoretical centers of rotation of the cross tenon and claws coincides with the connecting line the profile shown in Fig. 9 is obtained.

Figs. 10 and 11 show wall forming combinations according to the definition already given. The sum of the connecting lines of the theoretical joint centers gives the wall axis.

Figs. 12 and 13 show two further combinations, in which the theoretical connecting lines of the joint centers are perpendicular to each other. If the bar between the connecting lines of the joint centers is straight, and a cross tenon is used with claws embracing two arms, two wall-forming and two corner-forming combinations are possible. If the bar is once bent and therefore lies on one side of the theoretical connecting line of the joint centers, the profile shown in Fig. 14 is obtained.

Figs. 15 and 16 show the wall-forming combinations. In Fig. 16 the wall axis is parallel, and in Fig. 15 it lies in the connecting line of the theoretical joint centers.

Figs. 17 and 18 show two further possible combinations in which the theoretical connecting lines of the joint centers are perpendicular to each other.

With the once bent bar between the theoretical connecting line of the joint centers, and with a cross tenon and claws embracing two arms thereof, there are possibly two wall forming and two corner forming combinations.

Twice bent bars lying on one side of the connecting line of the theoretical joint centers are shown in Figs. 19, 20, 21, 22, and 23.

If the surface 2 is parallel to the connecting line of the theoretical joint centers, the forms shown in Figs. 24, 25, 26 and 27, resembling known types, are obtained in special cases. It is, however, novel to have two possible wall-forming and two possible corner-forming combinations with a twice bent bar lying on one side of the connecting line of the theoretical joint centers (including the special case) with the cross tenon and claws embracing two arms.

The bar bent several times lying on one side of the connecting line of the theoretical joint centers approaches in the limit the half circle. The conditions hardly vary from those previously cited. Bars bent several times intersecting the connecting line of the theoretical joint centers may be treated as special cases of the general profiles composed of curved pieces. A profile of this kind, drawn symmetrically for simplicity, is shown in Fig. 28. $u=90°$, designates the aperture angle, $t$ the tangents parallel to the connecting line of the theoretical joint centers, and $x$ the angle made by the bisector of the aperture angle and the connecting line. This profile allows in general of four combinations, but differs from those previously mentioned in that there are three wall-forming combinations and one corner-forming combination, Figs. 29, 30, 31 and 32. The angles made by the connecting lines of the theoretical joint centers are 180° (Fig. 29), $2R-2x$ (Fig. 30), $3R-2x$ (Fig. 31) and $2R-2x$ (Fig. 32). In all cases the profile tangents $t$ are parallel to the connecting lines of the theoretical joint centers, and the angles $x$ are shown.

In all the wall forming combinations it is desirable in practice that the backs of the iron members have flat surfaces all parallel to the wall axis, in order that girdle members, braces and the like can be easily joined. This is possible with the profiles according to Figs. 29 to 31 if in Fig. 31 the tangent $t$ is parallel to the wall axis, or in other words, if $3R-2x=180°$, or $x=45°$, that is to say the connecting line of the theoretical joint centers lies in the wall axis. The angles $2R-2x$ are then 90°.

If straight parts are substituted for the curves adjacent to the joints in Fig. 30 the profiles shown in Figs. 33 to 37 are obtained. This gives new forms which are valuable in practice.

If the angle $x$ is other than 45°, only the two forms shown in Figs. 29 and 30 can be furnished with parallel girdle surfaces; the same surface in Fig. 31 in the direction of the tangent $t$ is parallel with the connecting lines of the theoretical joint centers, not coinciding with the wall axis. The corner angle is then not 90°, but is given by $2R-2x$. In Fig. 31 it dies above or below the axis according as $x><45°$.

It is not absolutely necessary that the central arm of the cross tenon lies in the direction of the connecting line of the theoretical joint centers. It may, for example, be so directed that one or both of the side arms lies or lie in the direction of the connecting line, and the central arm is inclined, or perpendicular thereto if the arms are at right angles to each other. This makes wall-forming and corner-forming combinations up to four possible, according to profile, but the proportion of wall-forming and corner-forming combinations varies. It is also not necessary always to use like profiles; by using two related profiles of different shapes manifold combinations for wall-forming and corner-forming can be obtained. If a circular tenon is used instead of a cross tenon the same conditions obtain, with the modification afforded by the angle of aperture $v$ which is possible with the circular tenon. If it is assumed that $v=$max. 60° the angle $x$ in Figs. 9 to 36 would be 30° instead of 45°. For the rest all conditions are the same as with the cross tenon, with the modification that the corner-forming combinations are end-positions, and that all intermediate positions are possible, by reason of the rotatability of the tenon. Another essential difference exists *in statio respecta* between the arrangements in Figs. 29 and 31. Undulating cross-sections, whose connecting lines lie in or near the wall axis, have the disadvantage that their moments of resistance can only be calculated with theoretical accuracy in reference to those axes of the individual cross sections which are conjugate axes to the direction of load; calculations in reference to the wall axis is theoretically inaccurate if not made to the neutral axis, in view of the nature of the arrangement.

In Fig. 38 a wall portion is represented by two profiles, the direction of load being perpendicular to the wall axis. Z—Z are conjugate axes of the individual profiles to the direction of load. The individual profiles must bend about the axes Z—Z under the load. The direction of bending is perpendicular to the conjugate axes. The points O of the two profiles move in the direction of the arrow, so that the two profiles do not interfere with each other in their freedom of bending. The novel combination of profiles according to Fig. 39 obviates this disadvantage. The axes Z—Z conjugate to the direction of load converge and intersect each other in the symmetrical axis Y—Y. The bending of each profile takes place theoretically in the direction $d$, but owing to the difference of direction the bending cannot proceed in this direction. Reduced to horizontal and vertical components, the balancing of the horizontal components produces immobility in this direction. The movement can only take place in the direction perpendicular to the wall axis. As this applies to all junctions of the profiles, that is to say to their ends, it must apply to all points thereof. The whole profile therefore bends about the wall axis, which takes the place of the conjugate axes Z—Z. Profiles so combined act as continuous profiles and their moments of resistance can be calculated with theoretical accuracy in relation to the wall axis.

What I claim is:—

1. Interlocking sheet-piling comprising a series of interlocking pile members, each pile member having a tenon provided with a plurality of arms angularly disposed, and a claw, said claw adapted to engage with certain of the arms of the tenon of the adjacent pile member, one or more of said arms always being out of engagement with said claw for each locking position thereof.

2. Interlocking sheet-piling comprising a series of interlocking pile members, each pile member having a tenon provided with a plurality of arms symmetrically disposed with respect to the pile member and each other, and a claw, said claw adapted to engage with certain of the arms of the tenon of the adjacent pile member, one or more of said arms always being out of engagement with said claw for each locking position thereof.

3. Interlocking sheet-piling comprising a series of interlocking pile members, each pile member having a body portion, a claw at one end and a tenon at the other end of said body portion, each tenon comprising a plurality of arms extending from said body portion, one or more of said arms extending longitudinally in the general line of said body portion, and the other of said arms extending at right-angles thereto, the claw of one pile member adapted to engage with certain of said arms, one or more of said arms always being out of engagement with said claw for each locking position thereof.

4. Interlocking sheet-piling comprising a series of interlocking pile members, each pile member having a tenon provided with a plurality of arms angularly disposed, and a claw, said claw adapted to engage with certain of the arms of the tenon of the adjacent pile member, one or more of said arms always being out of engagement with said claw for each locking position thereof, the limits of movement of said claw with respect to the arms engaged, after engagement, being determined.

5. Interlocking sheet-piling comprising a series of interlocking pile members, each pile member having a tenon provided with a plurality of arms angularly disposed, and a claw having an aperture angle of substantially 90 degrees, the line joining the theoretical centers of the tenon and claw coinciding with one of the sides of said aperture angle, said claw adapted to engage and lock with certain of the arms of the tenon of the adjacent pile member.

In testimony whereof I affix my signature in presence of two witnesses.

FRIEDRICH WILHELM BRUSCH.

Witnesses:
WOLDEMAR HAUPT,
HENRY HASPER.